United States Patent [19]
Irwin et al.

[11] Patent Number: 5,404,527
[45] Date of Patent: Apr. 4, 1995

[54] SYSTEM AND METHOD FOR REMOTE PROGRAM LOAD

[75] Inventors: James S. Irwin, Stevens; Robert A. Johnson, Pottstown; Ira A. Klein, Collegeville, all of Pa.

[73] Assignee: Unisys Corporation, Blue Bell, Pa.

[21] Appl. No.: 999,002

[22] Filed: Dec. 31, 1992

[51] Int. Cl.⁶ .............................................. G06F 15/16
[52] U.S. Cl. ............................. 395/700; 364/DIG. 1; 364/280.2; 364/284.4; 395/200
[58] Field of Search ................................ 395/700, 200; 364/DIG. 1 MS File

[56] References Cited

U.S. PATENT DOCUMENTS

| | | | |
|---|---|---|---|
| 4,958,278 | 9/1990 | Meguro | 364/DIG. 1 |
| 4,994,963 | 2/1991 | Rorden et al. | 364/DIG. 1 |
| 5,109,484 | 4/1992 | Hughes et al. | 364/DIG. 1 |
| 5,109,515 | 4/1992 | Laggis et al. | 364/DIG. 1 |
| 5,142,680 | 8/1992 | Ottman et al. | 364/DIG. 1 |
| 5,146,568 | 9/1992 | Flaherty et al. | 364/DIG. 1 |

OTHER PUBLICATIONS

Robert A. Johnson, "LAN-Connected Workstations Via BNAv2, Part 1-The Origin, Design and Capabilities of LCW". Published in Unisphere, Jan. 1992.
*Advanced Netware V2.1 Internetwork Packet Exchange Protocol (IPX) with Asynchronous Event Scheduler (AES)*, Revision 2.0, Novell Inc., Jun., 1987.
*Internet Transport Protocols*, Xerox Corporation, Dec., 1981.

*Primary Examiner*—Thomas M. Heckler

[57] ABSTRACT

An apparatus and method for retrieving and sending the bootstrap loader and the DOS code from disk storage on a file server in a network to a workstation in the network during the boot process of the workstation where there are one or more file servers in the network and where the file servers may be different types of computer systems including mainframe computers.

18 Claims, 7 Drawing Sheets

SYSTEM AND METHOD FOR REMOTE PROGRAM LOAD

The present invention concerns LANs (Local Area Networks), in particular, LANs which couple workstations to mainframe computer systems that provide the functions of a file server, including system initialization functions.

BACKGROUND OF THE INVENTION

In a LAN, there may be one or more computer systems providing the functions of a file server for workstations coupled to the LAN. A typical file server provides disk retrieval and storage facilities. The computer systems which act as a file server may also provide a variety of other functions, such as those which are typically provided by a mainframe computer. For example, a mainframe computer may be running several applications at once such as a database program and a computer aided design (CAD) program, in addition to the application providing the file server functions for the workstations. An article entitled "LAN-Connected Workstations Via BNAv2, Part 1, The Origin, Design and Capabilities of LCW" by Robert A. Johnson and published in Unisphere in January 1992 is hereby incorporated by reference for its teachings on LANs and file servers.

A computer system which acts as a file server provides disk retrieval and storage facilities to workstations on the LAN. The workstation, through its Disk Operating System (DOS) and LAN card, communicates with the file server on the LAN. The disk facilities of the file server may appear as one or more disk drives to the workstation using DOS. These disk drives may be in addition to disk drives present in the workstation such as a floppy disk or a hard disk.

In some LAN systems, it is desirable to have "disk-less" workstations attached to the LANs in order to reduce costs, provide better security and data integrity, and to facilitate backup copying of data. Disk-less workstations, as the name implies, have no local disk drives. In these systems the disk drives attached to the file servers on the LAN provide the only data retrieval and storage facilities for the workstations. This centralizes the location of data storage facilities to only those computer systems on the LAN which provide the functions of a file server. Data integrity is thus enhanced since data is only stored in a few locations in the LAN. Data security is enhanced because users cannot copy programs and data onto removable media such as floppy disks.

Since disk-less workstation have no local disks, if the workstation is running DOS, it must somehow "boot" from a file server on the LAN. As used herein, the word "boot" means to initialize a system to run an operating system which is stored as a disk file. During the boot process, a DOS is loaded into a specific portion of the Random Access Memory, RAM, of the workstation. This is completed by a two step process which is invoked by a program running in the Read Only Memory Basic Input Output System, ROM-BIOS, in the workstation.

In the first of these two steps, the ROM-BIOS loads a small program called a bootstrap loader from a fixed location in disk storage into a specific portion of the RAM of the workstation and then passes control to this program. In the second step, the bootstrap loader locates the DOS code in the disk storage, loads the DOS into a specific portion of the RAM of the workstation and passes control to the DOS program. A book entitled "Inside the IBM PC", the fourth edition, written by Peter L. Norton, and published by Darby Press in 1992 is hereby incorporated by reference for its teaching on the operations of Personal Computers which use ROM-BIOS.

Thus, when a workstation performs the boot process, either during a cold boot process, which is performed when the workstation is turned on, or during a warm boot process which may be performed after a certain combination of keys are depressed, the bootstrap loader and the DOS are desirably easily accessible to the workstation on disk storage. Disk-less workstations as described above, however, do not have a floppy drive or hard disk and thus the bootstrap loader or the DOS must be retrieved from disk storage on a file server. In addition, even if the workstation has a floppy disk or hard disk, it may be desirable for security reasons to retrieve the bootstrap loader or the DOS program code from disk storage on a file server.

During the first step of the boot process, the ROM-BIOS of a workstation first generates a request for the bootstrap loader to be retrieved from a floppy disk device, if any, on the workstation. If this request is not successful, then the ROM-BIOS normally generates a request for the bootstrap loader to be retrieved from a hard drive, if any, on the workstation. In order to retrieve the bootstrap loader and the DOS from disk storage on a file server, it is desirable to modify this process.

One possible modification is to patch the ROM-BIOS to generate a request to read the bootstrap loader from disk storage on a file server instead of from a floppy disk or hard disk on the workstation. A modification similar to this is described in U.S. Pat. No. 5,109,515 to Laggis, et al. This modification, however, is not desirable since patching the ROM-BIOS reduces the portability and flexibility of the workstations. In addition, the bootstrap loader may also need to be modified to retrieve the DOS from the disk storage on the file server.

Another possible modification is to add a device to the workstation that intercepts one of the bootstrap loader retrieval requests generated by the ROM-BIOS. The device intercepts the bootstrap loader retrieval request from the ROM-BIOS, retrieves the bootstrap loader from a fixed location in the disk storage of a particular file server, and then transmits the bootstrap loader to the ROM-BIOS thus satisfying its request. In addition, requests by the bootstrap loader for the DOS object code are intercepted and satisfied by the device. This solution, however limits the flexibility of the system to the predetermined server and disk file. Furthermore, this solution adds a critical path which, if it fails, may cause a system-wide failure.

SUMMARY OF THE INVENTION

One method used to intercept and process boot strap loader requests from the ROM-BIOS is to use a LAN interface card in the workstation to intercept requests generated by the main processor under control of the ROM-BIOS and bootstrap loader during the boot process of the workstation. In the exemplary embodiment of the invention, a program in the LAN interface card interacts with other systems on the LAN to allow one of several servers on the LAN to provide the boot program and DOS.

The LAN interface card used in this invention intercepts requests from the ROM-BIOS and bootstrap loader during the boot process of the workstation and communicates with any server that may be coupled to the LAN according to a predetermined protocol.

According to one aspect of the invention, the protocol permits the LAN interface card to be used to communicate with one or more file servers on the LAN where the file servers may be different types of computer systems, including mainframe computers.

According to another aspect of the invention, the LAN interface card is used by the workstation to retrieve and store segments of the data from disk storage on a file server in addition to the segments of the data retrieved and stored from disk storage on the file server in response to the current request.

DETAILED DESCRIPTION OF THE EXEMPLARY EMBODIMENTS

Overview

Figure 1:
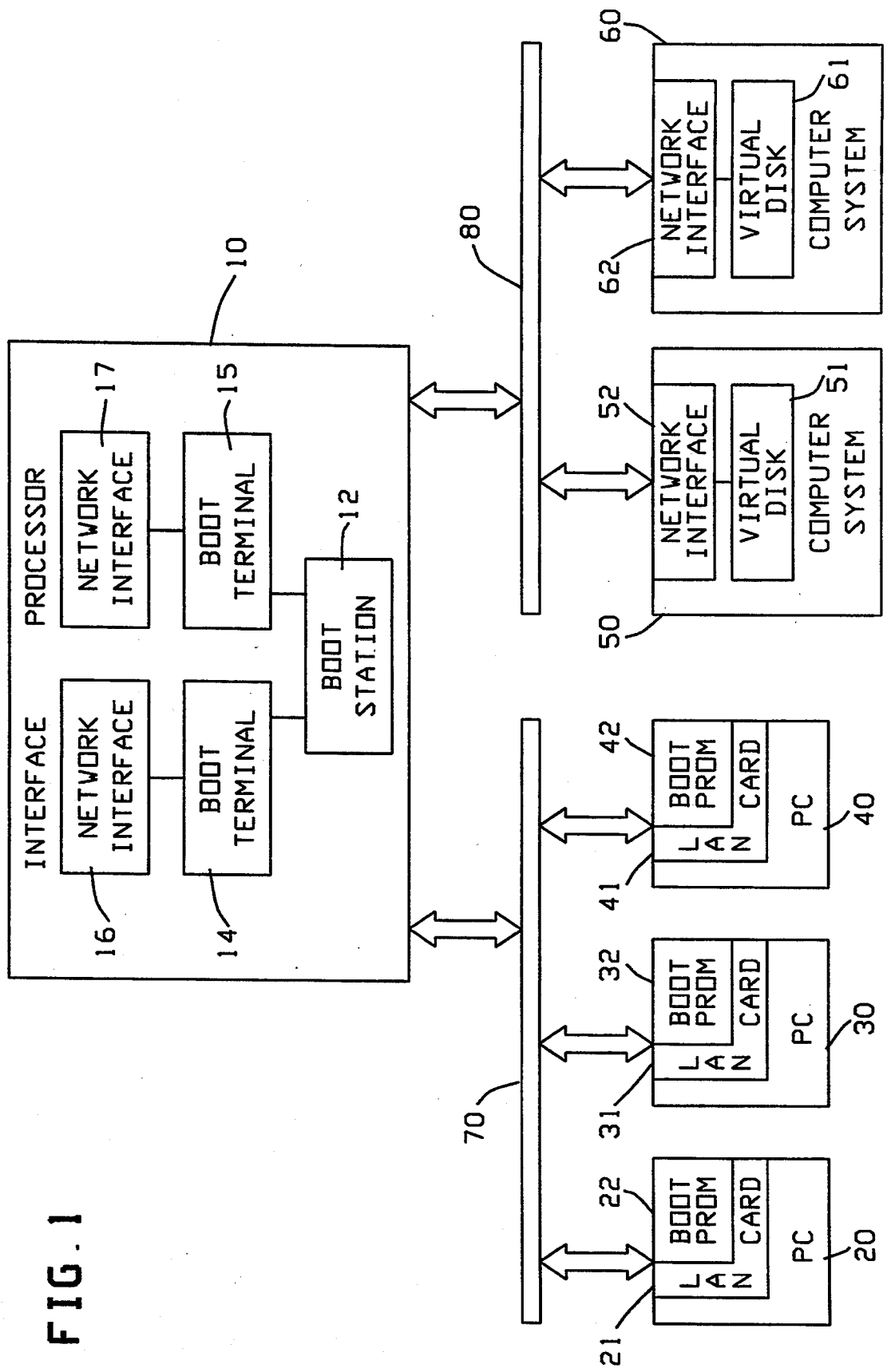
FIG. 1 is a block diagram of an exemplary network employing an embodiment of the current invention.

An exemplary network which includes an embodiment of this invention is shown in FIG. 1. A brief overview of the invention is presented by reference to this exemplary network. As shown in FIG. 1, three Personal Computers, PCs, 20, 30 and 40 are attached to one LAN 70 and two larger (e.g. mainframe) computer systems 50 and 60 are attached to another LAN 80 in the network. The two LANs 70 are 80 are connected by an interface processor 10. In this network, the computer system 50 or 60 may provide the functions of a file server.

In the exemplary embodiment of this invention, two primary steps are involved to transfer data from a file server to a PC during its boot process. First, during its initialization process, the PC selects a computer system that is running a virtual disk process and, so, is able to service data requests. Second, data to be stored and requests for data to be read are transmitted from the PC to the computer system which was selected in the first step.

The first step selects a file server that is able to process data requests made by the PC during its boot process. To complete this step, a boot-service-request packet is sent from-the PC to the interface processor 10. The interface processor 10 then determines which of the computer systems, 50 and 60, is able to process the request and sends a response packet back to the PC.

To be able to service the boot process request the computer system, 50 or 60 in the exemplary embodiment of the invention runs a virtual disk process 51 or 61. The virtual disk process provides the program code and data used by the PC in its boot process. The virtual disk process also permits the PC to access data storage on the computer system as a disk which is local to the PC and thus creates a virtual disk for the PC.

The PC waits for the first such response packet from the interface processor 10 which links the PC to a virtual disk process on one of the computer systems 50 or 60. Upon receipt of the first response packet, the PC sends an Open Boot Path packet to the interface processor 10.

The PC has now established a path between itself and a process which provides the functions of a file server. In this step, the PC did not need to know what file servers were in the network or were available, the protocol selects an available and capable file server for the PC. The interface processor 10 provides an address on the network to the PC which indicates a specific process in the interface processor 10 that will receive and process packets from the PC during the boot process.

The virtual disk process sends, as a part of its response packet, the host identifier of the computer system in which the virtual disk process is executing, through the interface processor 10, to the PC 20. The PC retrieves the address on the network and host identifier from the packet and stores them for future use during the boot process. The packet received by the PC also includes a Socket ID that uniquely defines the virtual disk process in the network which is accessible via the interface processor 10. This Socket ID is stored by the PC for later use, once the system is operating under control of the DOS, to access disk files maintained by the virtual disk process.

In the second step, a request for data transfer, a BIOS request packet is sent over the established link, using the stored address on the network and host identifier, to obtain the bootstrap loader from the disk storage of the file server, i.e., the virtual disk process. The address on the network identifies a path for a specific process in the interface processor 10 which communicates with the virtual disk process using the host identifier. This BIOS request packet is received by the virtual disk process running on the computer system 50 or 60 which provides the functions of a file server. If this computer system is currently able to process the request, a response packet containing the requested data from disk storage of the computer system is sent to the PC 20.

If the computer system is not able to handle the request, or if the network is too busy to handle the additional traffic, the interface processor 10 sends a Host Busy packet to PC. In response to this packet, or if no response is received within a predetermined amount of time, the PC 20 resends the BIOS request packet to the interface processor after a fixed time interval.

Once, the virtual disk process is able to respond to the BIOS request packet, a response packet containing the requested data from disk storage of the virtual disk process is sent to the PC 20.

This transfer process is completed for both the bootstrap loader and the DOS code. Once the DOS code is loaded into the RAM of the PC and control is passed to the DOS codes the PC may send a Close Boot Path packet to the computer system to close the boot process link between itself and the computer system, since the boot process is now complete. Alternatively, this path may be kept open for use by the PC in reading information from the boot disk using the virtual disk process.

DETAILED DESCRIPTION

A detailed example using the exemplary embodiment of this invention is presented by reference to FIG. 1 and the flowchart diagrams in FIGS. 2–6. The detailed example describes the entire process of booting a PC from a file servers in particular, the entire boot process of the PC system 20 in FIG. 1 from one of the virtual disk processes 51 and 61 running on the respective computer systems 50 and 60.

When the PC system 20 performs the cold boot process (i.e. when power is applied to the workstation) the PC 20, under control of the ROM-BIOS performs a number of start-up routines. Generally, the PC first executes the Power-On Self-Test, POST, routine. The POST routine may check the memory of the PC system 20 and other parts of the PC system 20. Next, the PC executes an initialization routine. This routine may create interrupt vectors for the PC system 20 and define initial values for registers and parameters.

The last start-up routine that the PC executes during the cold boot process, under control of the ROM-BIOS, is the boot routine. This routine is also executed by the PC from the ROM-BIOS during a warm boot process. A warm boot process may be performed after a certain combination of keys are depressed (e.g. Ctrl, Alt & Del). In response to this signal, the PC, executing the boot routine, attempts to read a boot record containing the bootstrap loader from the beginning of a disk, normally drive A, and if this request fails from drive C. In this process, the PC, using the ROM-BIOS, generates a BIOS request which indicates that the boot record is to be read from a specific drive. In the exemplary embodiment of the invention, a programmable read-only memory (PROM) 22 on a LAN card 21 of the PC system 20 contains a program which allows the LAN card to emulate the A drive and so, causes the LAN card to intercept the BIOS requests for the boot record and DOS code. In this configuration, a processor on the LAN card operates under control of the boot prom 22. Alternatively, the program in the boot PROM 22 may control the PC system 20 directly, causing it to issue the request for the boot record and DOS code through the network 70 using the LAN card 21. In this configuration, the LAN card does not emulate a disk drive but, instead, the PC system 20 is modified by the boot PROM code to issue disk requests, at least during the boot process, through the LAN. In the material that follows, both of these configurations are referred to generically as the PC system 20 operating under control of the boot PROM 22.

Under control of the boot PROM 22, the PC system 20 monitors BIOS requests generated by the main processor under control of the ROM-BIOS. If the BIOS request is to read data from the drive being emulated by the PC system under control of the boot PROM 22, the request is intercepted. Then, in this exemplary embodiment, the PC system 20 begins a four step process to retrieve the bootstrap loader and DOS code from disk storage on the computer system 50 or 60 using a specific protocol.

Figure 2:
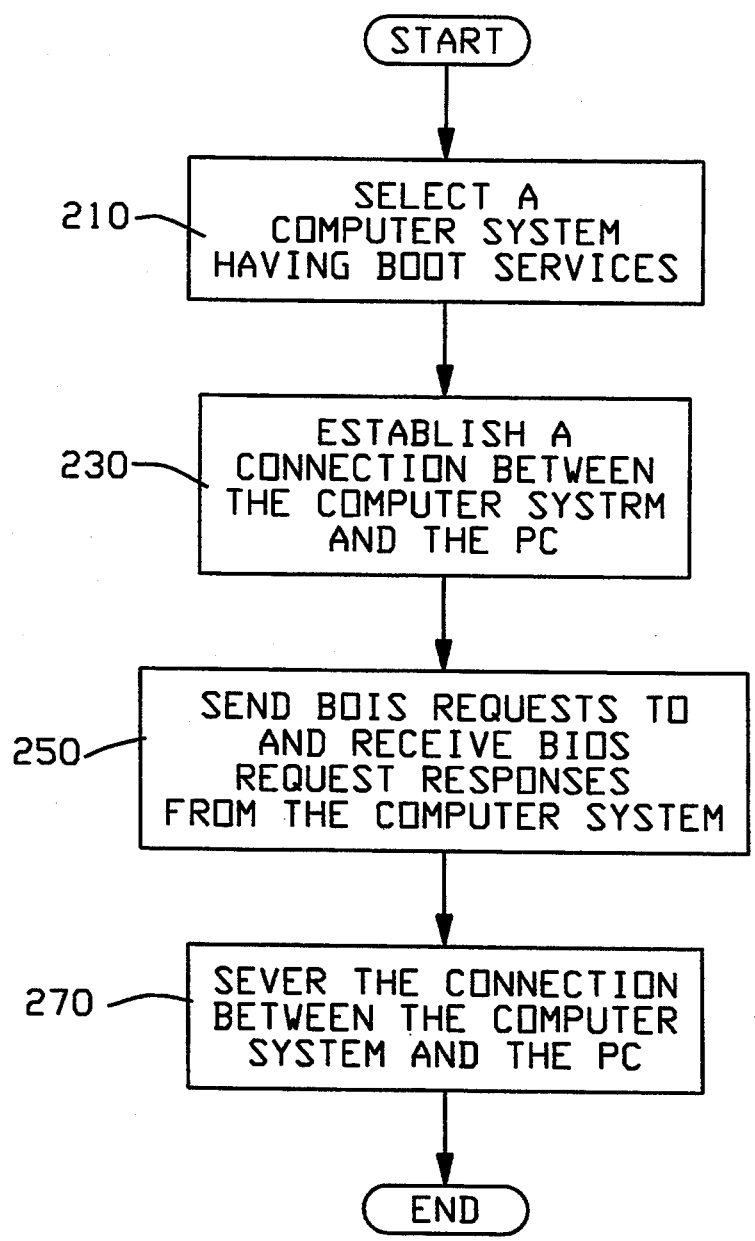
FIGS. 2–4, 5A, 5B and 6 are flow chart diagrams which are useful for describing the exemplary embodiment of this invention.

The four step process, which is shown in the flowchart diagram in FIG. 2, includes: first, step 210, selecting a computer systems 50 or 60 to be used to provide boot services; second, step 230, establishing a connection between the PC system 20 and the virtual disk process running on the computer system, 50 or 60; third, step 250, sending the BIOS requests, which were generated by the boot routine in the ROM-BIOS, to the virtual disk process and receiving BIOS request responses from the virtual disk process; and fourth, step 270, severing the connection between the virtual disk process running on the computer system and the PC system 20 after the boot process is completed 270. This fourth step is optional.

The first part of the boot process, selecting a computer system to provide the boot services, step 210, is described in detail with reference to FIG. 3. As shown in this Figure, the first step in locating a computer system running a virtual disk process, step 310, is to generate a boot-service-request packet and to send it to the computer systems that are associated with the PC system that generated the request. This step is performed in part by the PC 20 under control of the boot PROM 22, and in part by the interface processor 10.

The PC system 20, using the instructions stored in the boot PROM 22, generates a boot-service-request packet and broadcasts the packet onto the LAN 70. Each packet generated by the PC system 20 contains an address field which identifies what device or process attached to the LAN 70 is to receive the packet placed on the network by the PC 20. Each packet also contains a Socket ID which is used by the interface processor 10 to direct the packet to a specific process within the interface processor 10 or the computer system 50 or 60. Finally, each packet may also contain a host identifier, HOST_ID, which indicates a specific computer system 50 or 60 which is to receive the packet.

In the exemplary embodiment of the invention, the address on the network for the boot-service-request packet is set to a predefined value, for example, FFFFFFFFFFFF hexidecimal for Ethernet packets, to indicate that all processes which are connected to the LAN 70 are to receive this packet. This type of packet is commonly called a broadcast packet. The Socket ID is set to a registered standard Xerox TM ID which indicates that the PC wants to start the boot process. The HOST_ID is set to zero since the PC does not know which computer system provides boot services via a virtual disk process executing on the computer system. In another exemplary embodiment of the invention there is only one computer system associated with any PC in the network. In this embodiment, the HOST_ID is not used since it is not necessary. Data on the exemplary LAN 70 is conveyed using the Internet Datagram Protocol (IDP) from the Xerox TM Network System (XNS) specification for the Link Layer Transport. Details on the implementation and operation of local area networks (LANs) may be found in a book by Gerd E. Keiser entitled, *Local Area Networks*, McGraw-Hill, 1989 which is hereby incorporated by reference for its teachings on LANs.

The PC 20, under control of the boot PROM 22, adds the header information required for the IDP to the boot-service-request packet and transmits the packet onto the LAN 70.

Because the address on the network is set to the predefined value indicating a broadcast packet, the interface processor 10 receives a copy of the packet and evaluates the Socket ID. Because the Socket ID indicates that the PC which generated the packet wants to start the boot process, the interface processor 10 directs the packet to the Boot Station process 12 in the interface processor.

The boot station 12 provides the primary control and interface for the PC and a virtual disk process on a computer system during the boot process of the PC. The Boot station retrieves packets generated by the PCs during their boot process directed to the virtual disk process on a computer system. The boot station reformats the packet as necessary and transmits the packet to the appropriate computer system via the boot terminal 14 or 15 and the network interface 16 and 17. In one exemplary embodiment of the invention, one boot station directs packets to one or more computer systems via boot terminal and network interfaces. In another exemplary embodiment (not shown) the boot station would only direct the packet to one boot terminal and network interface and thus two boot stations (not shown) would be used to process packets for both computer system 50 and 60 shown in FIG. 1.

The Boot terminal 14 and 15 and the network interface 16 and 17 provide the interface between the boot station 12 and the computer systems 50 and 60 in one exemplary embodiment of the invention. When the interface processor 10 is initialized a boot table is generated which indicates the connections between the network interface 52 and 62 and the virtual disk processes 51 and 61 operating on the computer systems 50 and 60 and the network interface 16 and 17. In one exemplary embodiment of the invention, the virtual disk process 51 or 61 provides boot services by a Boot Services Application, BSA, and also provides Data Transfer Services, DTS, by a DTS application. The boot table in the interface process indicates the BSA of the virtual disk processes 51 or 61 in the computer systems 50 or 60. In the exemplary embodiment of the invention, a copy of the boot table is also stored by the computer systems 50 or 60 for data integrity purposes. Then the boot table is updated when appropriate in both the interface processor 10 and the appropriate computer system. This system enables the interface processor to recover from hardware or software failures by re-initializing its boot tables from the computer systems 50 or 60.

In the exemplary embodiment the network interfaces 16 and 17 direct packets to the virtual disk process 51 and 61 by placing the packets on the LAN 80. The network interface 52 and 62 receive packets on the LAN 80 that are directed to the computer system 50 and 60. In another exemplary embodiment (not shown), there may be a direct connection between the network interface in the interface processor 10 and the network interface in the associated computer system, i.e., with reference to FIG. 1, a direct connection (not shown) between network interfaces 16 and 52, and 17 and 62. In this alternative embodiment LAN 80 would not be present.

In the exemplary embodiment, however, the interface processor 10 via the boot station 12, boot terminals 14 and 15, and network interfaces 16 and 17, receives the broadcast packet from the LAN 70, reformats it if necessary, and transmits it onto the LAN 80 where it may be received by processes connected to the LAN 80 which are running on the computer systems 50 and 60. The interface processor 10 receives all packets on the LAN 70 that may be directed to one of the computer systems 50 and 60. Accordingly, it receives the broadcast boot-service-request packet generated by the PC system 20.

The reformatting and transmission of the broadcast packet are performed in the interface processor 10 by routines denoted as boot station 12, boot terminal 14 and network interface 16 in FIG. 1.

The interface processor 10, under control of the boot station routine 12, as described above, receives the boot-service-request packet and removes the IDP header information from the packet. In the exemplary embodiment of the invention, the boot station routine 12 then determines which of the virtual disk processes that are active on the network are to receive copies of the packet. This determination is made by evaluating the boot table. In this case since the HOST_ID is set to zero, the boot services request packet is sent to all processes associated with the LAN 70 through the interface processor 10 (i.e. the computer systems 50 and 60 on the LAN 80) that are active, as indicated by the boot table.

The boot terminals 14 and 15 and the network interfaces 16 and 17 provide the interface between the boot station 12 and the LAN 80 via a network services routine operating in the interface processor 10. These devices augment the boot services request packet with the necessary header information for the protocol used in the virtual disk process. The network interfaces 16 and 17 place the packet onto the LAN 80.

The virtual disk processes running on computer system 50 and 60 which are active on the LAN 80 each receive the packets on the LAN that are addressed to them by the network interfaces 52 and 62. In this case since the HOST_ID is set to zero, the boot station 12 will generate a packet for both virtual disk processes 51 and 61 running on computer systems 50 and 60 and thus both virtual disk processes will receive a copy of the boot services request packet. If computer system 50 or 60 is executing a virtual disk process that can provide boot services for the requesting PC system 20, the boot station 12 generates a boot services request response packet directed to the PC system 20 and places the packet on the LAN 70. This packet contains the address on the network of the boot station 12, HOST_ID of the computer system and the Socket ID for the virtual disk process running on the computer system. The Socket ID may be used for data storage and retrieval requests made by the PC after the boot process is complete. Those requests are serviced by the DTS application in the virtual disk process in the computer system.

The process of transmitting the boot services request response packet from the computer system to the PC is the reverse of the process described for the transmission of the boot services request packet, the boot services request response packet is received by the interface processor 10, reformatted, and placed on the LAN 70. The interface processor 10 receives packets on the LAN 80 which are directed to the devices that are attached to its in this case directed to the network interface 16 or 17. The network interface and boot terminal remove header information used by the protocol in the LAN 80 and pass the packet to the boot station 12.

The boot station 12 adds the address on the network of the boot station and the HOST_ID of the computer system that generated the boot services request response packet to the packet and places the packet onto the LAN 70. During the initialization of the interface process 10, this address on the network in stored in the boot table.

The PC system 20 which also reads and retrieves packets addressed to it in the LAN 70 retrieves the boot services request response packet from the LAN 70.

Figure 3:
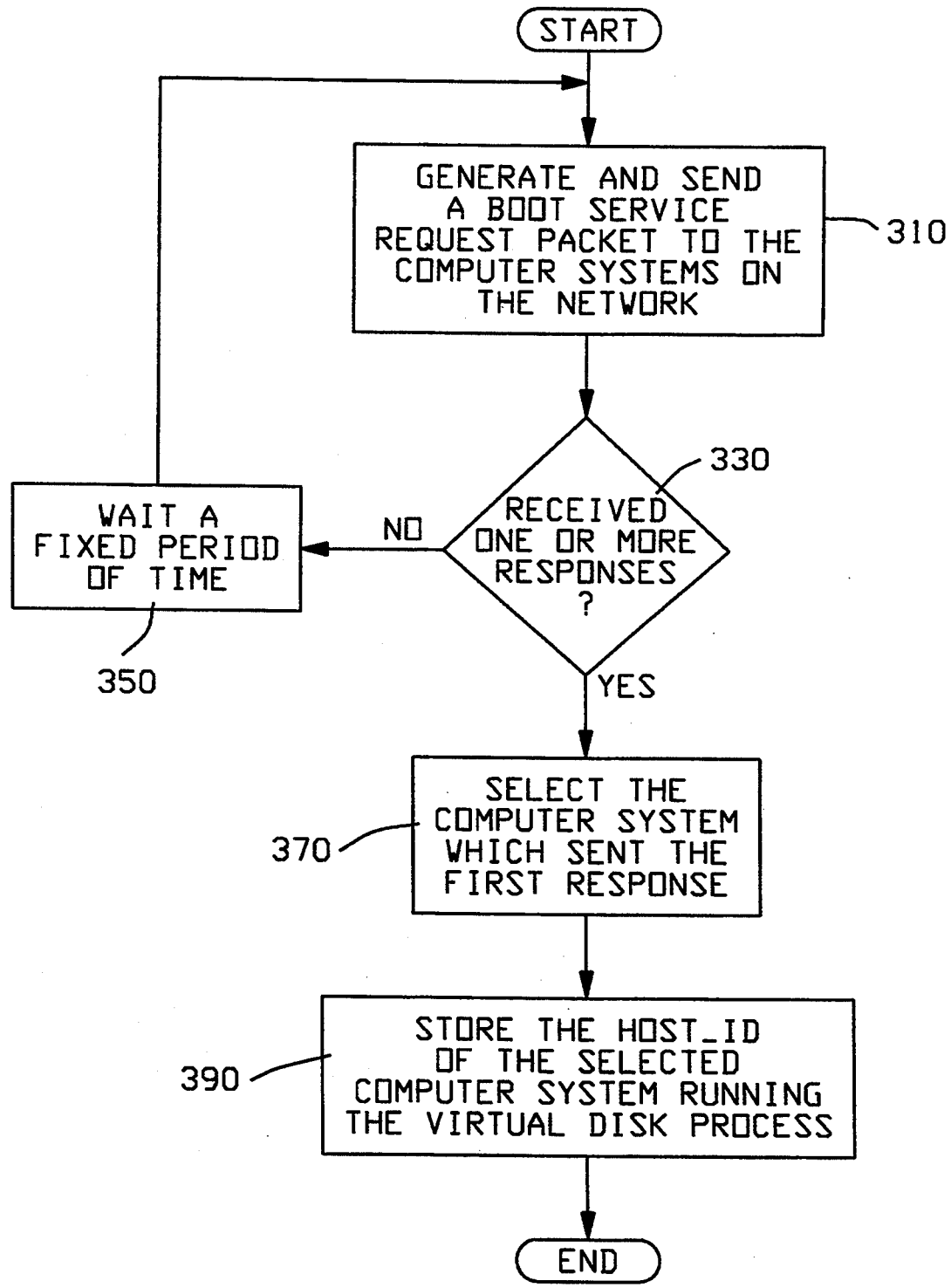

Referring to FIG. 3, if the LAN card 21, at step 330, does not receive a response, it waits a fixed period of time, step 350, and then generates another boot services request packet. Whenever, the PC does not receive a response to a packet, it regenerates the packet. In the exemplary embodiment of the invention, the virtual disk process 51 waits until it receives five more packets before it resends the packet to the appropriate computer system. This helps prevent contention on LAN 80 and the computer system receiving and answering the same packet. When one or more responses are received at step 330, the PC 20, step 370, in the exemplary embodiment of the invention, selects the computer system which sent the first boot service response packet to be received.

In another exemplary embodiment, the virtual disk process may, for example, add a loading factor to the boot-service-request response packet. This loading factor may indicate the current percentage of central processor unit, CPU, usage in the computer system on which the virtual disk process is running. Then, if the PC 20 receives more than one boot-service-request response packet, it may select the process which is running on the computer system that has the lowest loading factor. In either embodiment, at step 390, the PC 20, under control of the boot PROM 22, stores the address on the network of the boot station 12, the HOST_ID and Socket ID for DTS. The address on the network is used in packets sent from the PC 20 to the selected computer system via the interface processor 10 during the boot process. These include the open boot path request packet and BIOS requests, to identify the destination process and, once a path is established, to identify the destination process and the path to be used to transfer data between the PC 20 and the destination process.

Figure 4:
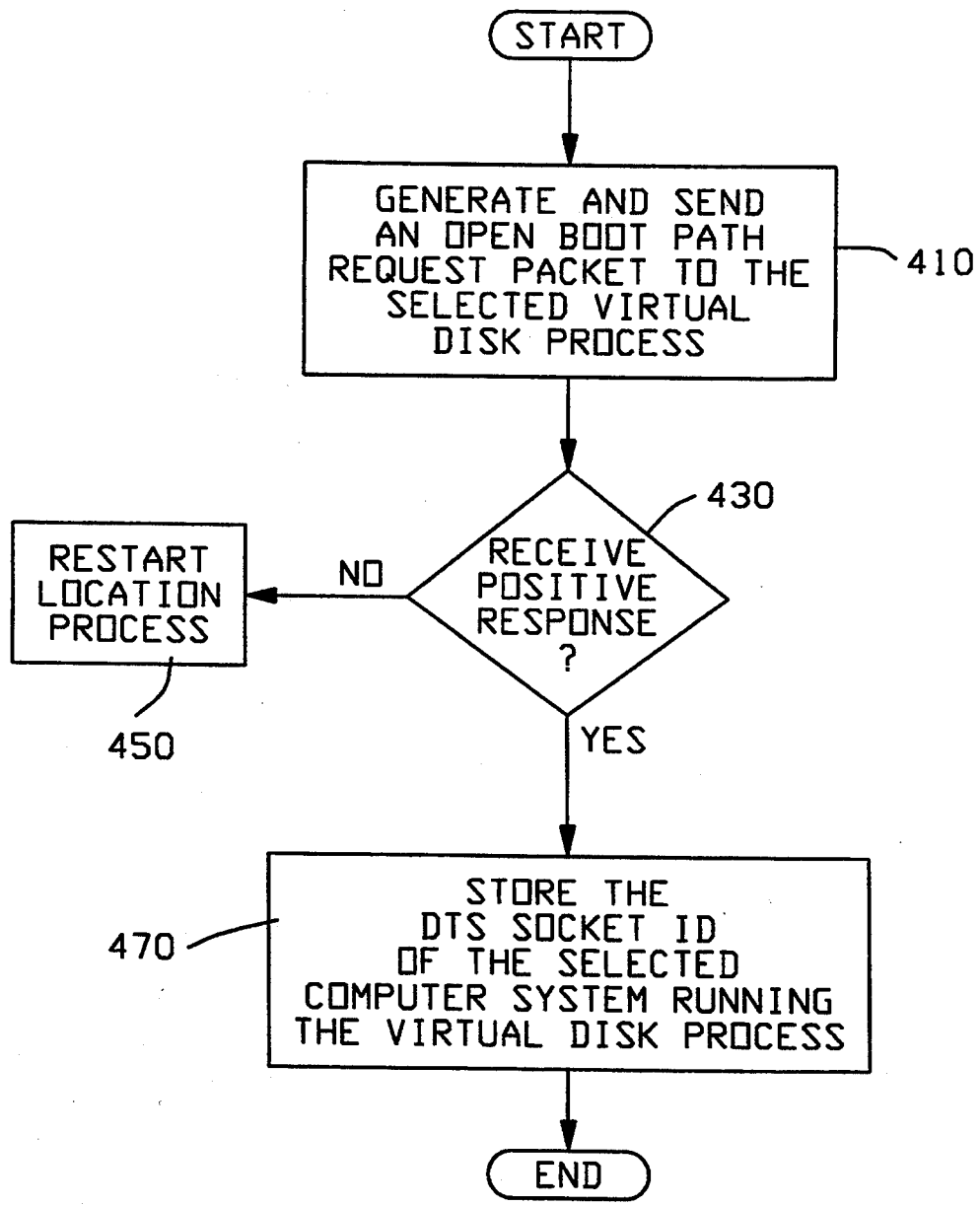

After the PC 20 under the control of the boot PROM 22 has selected a virtual disk process 52 to provide boot services it notifies the process that it has been selected. The PC 20 then receives the DTS Socket ID which is used in future disk retrieval and storage requests after the boot process is complete. This procedure is described with reference to FIG. 4. As shown in FIG. 4, at the first step, 410, an open boot path request packet is generated and sent to the virtual disk process 52 running on the computer system 50.

The PC 20, under control of the boot PROM 22, uses the stored address on the network and HOST_ID to generate this packet and places the packet on the LAN 70. As described above, the interface processor 10 via the boot station 12, boot terminals 14 and 15, and network interfaces 16 and 17 receives this packet, reformats and transmits it to the identified virtual disk process running on the selected computer system. The boot station 12 uses the packet type (i.e. open boot path request) and the HOST_ID to transmit the open boot path request packet to the selected virtual disk process. In another exemplary embodiment of the invention, only one computer system is associated with each boot station 12 and thus the HOST_ID is not used.

The packet is placed onto LAN 80 where the it is received by the selected process. If the selected process is still able to provide boot services, it generates an response packet and DTS Socket ID. It then places the DTS Socket ID value into the open boot path request response packet. The virtual disk process sends the packet to the PC system 20 through the interface processor 10 with a positive response code.

If the selected virtual disk process is not able to provide boot services at this time, it sends back an open boot path request response packet with a negative response code. In either case, the open boot path request response packet is sent back to the PC system 20 via the interface processor 10 and the LAN 70 as described above.

If, at step 430, the PC 20 receives the open boot path request response from the LAN 70 and the response is positive, the PC 20, at step 470, stores the DTS Socket ID. If the response at step 430 is negative, the boot process is started over again, at step 450, by again sending a boot-service-request packet to select a computer system to provide boot services.

As noted above, the open boot path request response packet has a positive response code and a DTS Socket ID if the selected virtual disk process is still able to provide boot services for PC system 20. The PC 20 may now complete BIOS disk requests generated by the boot routine in the ROM-BIOS.

In the exemplary embodiment, the boot routine in the ROM-BIOS in the PC system 20 retrieves the bootstrap loader from disk storage, stores the bootstrap loader into predetermined memory locations in the PC system 20 and then transfers control to it. The bootstrap loader then retrieves the DOS code from the identified virtual disk storage and loads the DOS code into memory in the PC system 20. The bootstrap loader and DOS code are retrieved from disk storage by BIOS disk requests. The PC 20 under the control of the boot PROM 22 intercepts theses BIOS disk requests and sends them to the selected computer system after the open boot path connection has been established.

Figure 5A:
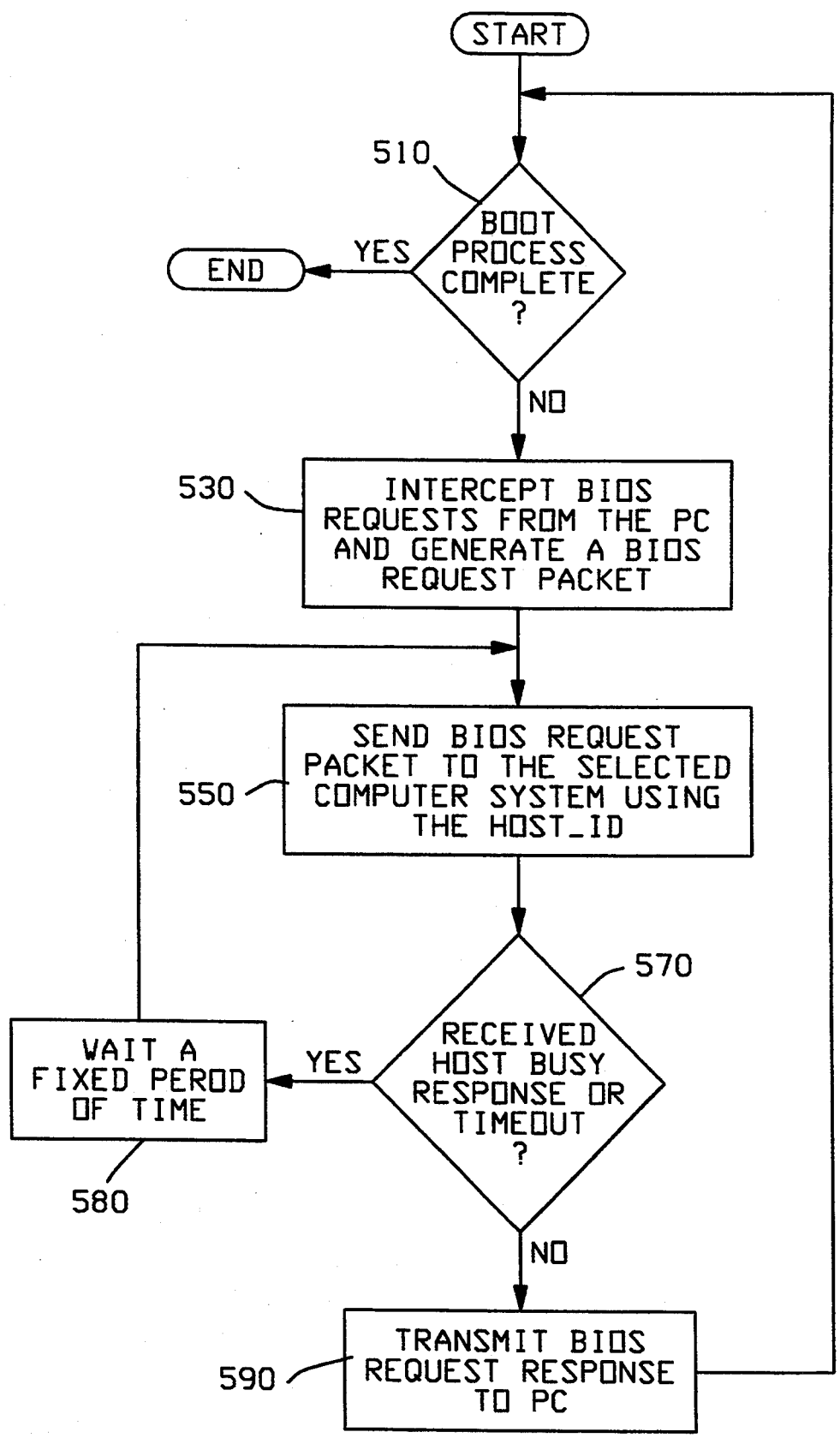

The virtual disk process 51 or 61 fulfills the BIOS disk requests by sending the appropriate data from disk storage (not shown) in the computer system 50 or 60. This process is described with reference to FIGS. 5A and 5B. As shown in FIG. 5A, the PC 20 under the control of the boot PROM 22 in the exemplary embodiment, at step 510, continues to intercept BIOS requests from the PC system until the boot process is complete. In the exemplary embodiment of the invention, the boot process is complete when the DOS code has been loaded into the memory of the PC system 20 and control has been passed to this code. In another exemplary embodiment of the invention, the boot process is not complete until a certain command is executed by the PC 20. In another exemplary embodiment, this path may continue to process BIOS requests even after the boot process is complete.

Thus in one exemplary embodiment, if, at step 510, the PC 20 recognizes a BIOS request, and determines that the boot process is complete, it enters the last step of the four step process shown in FIG. 2. Otherwise, it passes control to step 530 which intercepts the BIOS request.

At step 550, the BIOS-disk-request packet type, address on the network and HOST_ID are used to generate and send a BIOS request packet to the selected computer system 50 or 60. The selected computer system receives the BIOS request packet via the interface processor 10 and the LAN 80. If the virtual disk process, 51 or 61, or the network is currently too busy to complete the BIOS request, the interface processor 10 via the boot station 12 generates and sends a host-busy-response packet to the PC system 20. Otherwise, at step 590, the process 51 or 61 fulfills the BIOS-disk-request packet by retrieving the requested data in disk storage indicated by the BIOS request information in the packet. This information identifies the requested data by track and sector numbers as if it were stored in a disk local to the computer system 20. Accordingly, the virtual disk process 51 desirably translates this information to obtain the requested data from its physical media (not shown).

Alternatively, the virtual disk process may be coupled to physical media (not shown) which is formatted as a DOS disk and which includes at least the bootstrap loader and DOS files at the same the track and sector numbers as are contained in the BIOS request.

In the exemplary embodiment of the invention, after the virtual disk process receives a BIOS request for the bootstrap loader, it sends a single 512 byte packet containing the bootstrap loader to the PC system 20. When the first BIOS request is generated by the bootstrap loader to bring the DOS code file into memory, the PC 20, under control of the boot prom 22, requests a larger amount of data than may fit in a single packet. Then when the bootstrap loader requests another segment of the DOS code to be read from the virtual disk, this segment will already be stored, pre-fetched, in a memory area (not shown) in the PC 20. All the DOS code is prefetched by the PC 20 in this manner.

In another exemplary embodiment of the invention, the interface processor 10 requests and receives the DOS code from the virtual disk process and stores it in a memory until the PC 20 requests the DOS code. This process is described in detail with reference to FIG. 5B. In this embodiment, the interface processor 10 receives the DOS code in larger packets than the PC 20 can support, stores the code in a buffer memory, which has a length equal to the maximum output message size (MOMS) of the boot station 12, and then transmits the code to the PC 20 as the PC 20 requests the data. This embodiment reduces the packet traffic between the interface processor and computer systems since larger packet sizes are used to transfer data than the PC can support and thus less packets are needed to transfer the DOS code from the computer system to the interface processor.

Figure 5B:
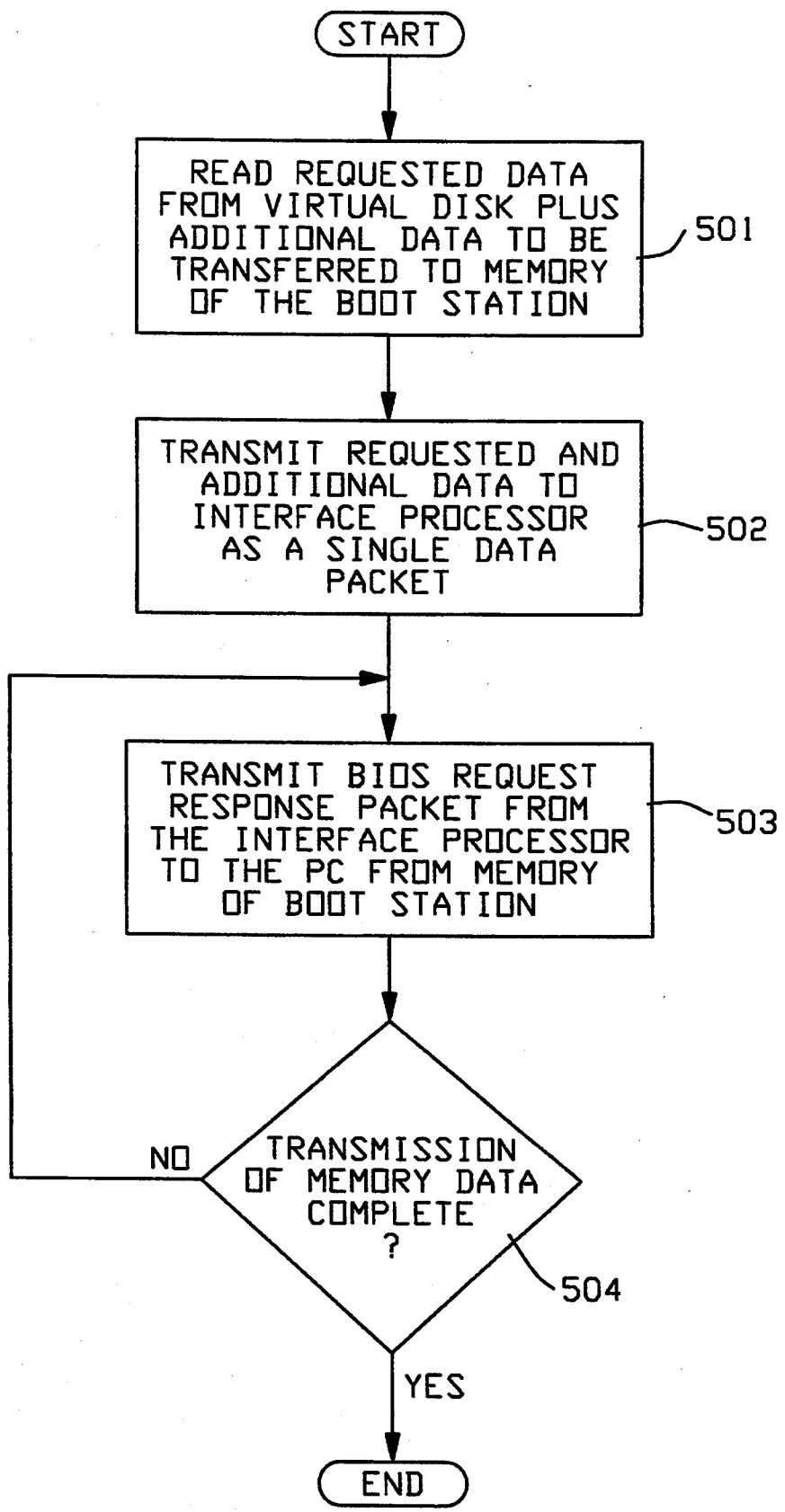

As noted in FIG. 5B, the first step 501 of this process is to retrieve the data requested by the PC 20 and also additional data at the same time, i.e., the segment of the DOS code currently requested by the PC 20 and additional segments of the DOS code that can be sent simultaneously because the packet size between the computer system and interface processor is larger than the PC 20 packet size. In step 502, these segments of the DOS code are sent to the interface processor as one packet or message. Then, at step 503, the segments of DOS code are sent to the PC 20 as requested, a single packet at a time, i.e., in the packet size that the PC 20 supports. This process is continued, at step 504, until all the segments of the DOS code have been transmitted to the PC 20.

In another exemplary embodiment of the invention, the virtual disk process starts to send packets containing the DOS code in response to the request for the bootstrap loader before it receives requests for the DOS code. The PC 20 or interface processor has a memory (not shown) where it stores the pre-fetched DOS code until a BIOS-disk-request for the DOS code is generated by the bootstrap loader. Then the appropriate segment of the DOS code is transferred from the PC 20 or interface processor 10 memory area to the RAM of the PC 20.

Regardless, the interface processor 10 sends back either a host-busy-response packet or a BIOS-disk-request-response packet from the virtual disk process running on the computer system. In the exemplary embodiment of the invention, if, referring again to FIG. 5A, at step 570, the PC 20 receives a host-busy-response packet, then, at step 580, it waits a fixed period of time and resends the BIOS request packet, at step 550, to the virtual disk process running on the selected computer system. In the exemplary embodiment of the invention, however, the virtual disk process does not forward resent packets to the virtual disk process until it has received five such packets in order to allow the computer system adequate time to process the request and thereby reduce possible contention in the computer system and interface processor 10.

In another exemplary embodiment of the invention, the interface processor 10 may queue the BIOS request packet and send a host busy response packet to the PC system 20 if the virtual disk process running on the computer system is not currently able to process the BIOS request packet or the network is too busy. Thus, in this embodiment, the PC 20 would not resend the BIOS request packet. In either embodiment, however, if, at step 590, the PC 20 under the control of the boot PROM 22, receives a BIOS request response packet it transmits the data to the ROM-BIOS. In the exemplary embodiment of the invention, as noted above, the interface processor, however, will wait until it has received five such packets before resending the packet to the computer system.

As noted above at step 510, the PC 20 intercepts BIOS disk requests until the boot process is complete 510 then the last step of the four step process shown in FIG. 2 is performed. As noted above, in other exemplary embodiments, this path may not be closed after the boot process is complete or may be closed by a specific command issued by the PC 20. This step severs the connection between the PC system 20 and the virtual disk process running on the selected computer system. The process of severing the connection between the virtual disk process running on the selected computer system and the PC system 20 is described by reference to FIG. 6.

Figure 6:
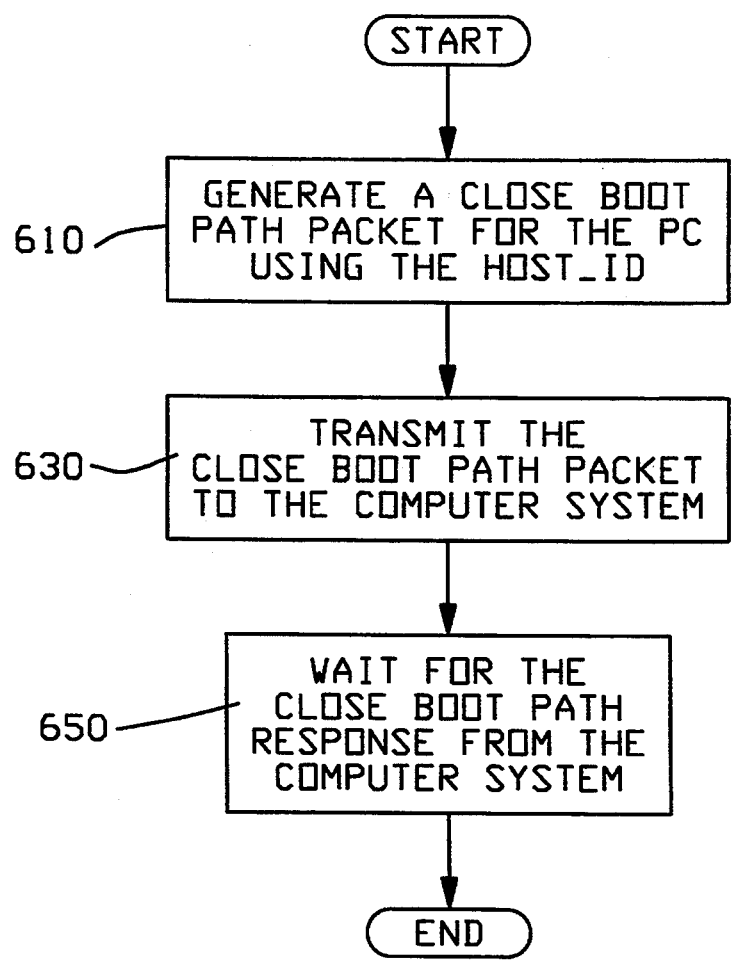

As shown in FIG. 6, at steps 610 and 630, the PC 20 under the control of the boot PROM 22, generates a close-boot-path-request packet containing the address on the network and HOST_ID and sends the packet to the virtual disk process running on the selected computer system via the LAN 70 and the interface processor 10. In another exemplary embodiment of the invention, the HOST_ID is not used since only one boot station 12 is associated with each computer system and the address on the network already uniquely identifies the boot station 12 and thus the associated computer system. The virtual disk process running on the selected computer system receives the close-boot-path-request packet from the LAN 80. This process permits the virtual disk process running on the computer system to free up resources for other PCs that may want to use the boot services of the virtual disk process.

At this point although the boot process is essentially complete, the PC 20 has previously stored the DTS Socket ID of the virtual disk process running on the selected computer system. The DTS Socket ID is used to service disk BIOS requests generated by the PC 20 under the control the DTS application which runs on the PC in conjunction with other software products to enable the PC 20 to retrieve and store data on the disk storage of the computer system. By storing the DTS Socket ID, the PC 20 already has a path established between the PC and the virtual disk process for servicing future disk storage and retrieval requests from the PC directed to the virtual disk on the selected computer system. The DTS system is invoked by the PC 20 before closing the boot path.

In the final step of this process, the virtual disk process running on the computer system generates and sends a close-boot-path-request-response packet to the PC system 20. In the exemplary embodiment of the invention, this packet always has a positive response code. After the PC 20 receives the close-boot-pathrequest-response packet, at step 650, the boot process performed by the PC 20 is complete. After the boot path is closed, the PC system 20 enables the disk drive which was being emulated through the LAN card 21, if one exists.

Although the invention has been described in terms of an exemplary embodiment, it is contemplated that it may be practiced as outlined above within the spirit and scope of the appended claims.

What is claimed is:

1. In a network having workstations with boot processes and a plurality of computer systems which are coupled to a respective disk storage device, an apparatus for obtaining boot services for a workstation from the disk storage device coupled to a respective one of the plurality of computer systems during the boot process, the workstations, the computer systems, and the apparatus coupled to the network, wherein during the boot process some ones or all of the computer systems can provide boot services, said apparatus comprising:
   means for sending a boot service request on the network;
   an interface processor coupled to the network, the interface processor comprising:
   (a) means for communicating with the workstations and the plurality of computer systems,
   (b) means for intercepting the boot service request on the networks,
   (c) means for selecting which ones of the plurality of computer systems can provide boot services,
   (d) means for sending the boot service request on the network to the selected computer systems, said boot service request being formatted to be received by the selected computer systems,
   means for receiving a response on the network from one of the selected computer systems to establish the one computer system as a provider of the boot services; and
   means for communicating on the network with the one computer system to obtain the boot services for the workstation from the disk storage device coupled to the one computer system.

2. Apparatus according to claim 1 wherein the one computer system is the one of the selected computer systems which is the first to respond to the boot services request.

3. The apparatus in claim 1, where the interface processor includes:
   means for storing messages sent from a computer system to the workstation which are larger than can be sent to the workstation; and
   means for transmitting the stored messages in segments to the workstation responsive to a request for the segments of the stored messages being received by the interface processor from the workstation.

4. The apparatus in claim 1, where the interface processor includes:
   means for selecting a computer system to provide boot services for the workstation in response to receiving a boot service request message from said workstation; and
   means for transmitting a response to the boot service request message indicating that the selected computer system will provide boot services.

5. In a network having a workstation with boot processes, a plurality of computer systems capable of providing the functions of a file server for the workstation, and an interface processor for communicating with the workstation and the computer systems, the workstation, the computer systems, and the interface processor coupled to the network, a method of obtaining boot services from one of the computer systems during the boot process of a workstation on the network, wherein during the boot process some ones or all of the computer systems can provide boot services, said method comprising the steps of:
   (a) sending, from the workstation, a boot service request on the network;
   (b) intercepting, at the interface processor, said boot service request on the network,
   (c) selecting, at the interface processor, which ones of the plurality of computer systems can provide boot services,
   (d) sending, from the interface processor, the boot service request on the network to the selected computer systems, the boot service request being formatted to be received by the selected computer systems,
   (e) receiving, at the interface processor, a response from a responsive one of said selected computer systems; and
   (f) opening a path through the network to the responsive computer system for providing boot services to the workstation.

6. In a network having a workstation with a boot process, a plurality of computer systems capable of performing the functions of a file server, and an interface processor for communicating with the workstation and the computer systems, the workstation, the computer systems, and the interface processor coupled to the networks a method of retrieving informations through the network, from a disk storage coupled to a respective one of the plurality of computer systems during the boot process of the workstation, wherein during the boot process some ones or all of the computer systems can provide boot services, said method comprising the steps of:
   (a) selecting, at the interface processor, which ones of the plurality of computer systems can provide boot services,
   (b) sending, from the interface processor, a request for retrieval of the information through the network, said request to be received by the selected ones of the plurality of computer systems which are coupled to the network;
   (c) receiving, at the interface processor, a first response from a responsive one of the selected computer systems;
   (d) responsive to the first response, sending, from the interface processor, a confirmation to the responsive computer system on the network;
   (e) intercepting, at the interface processor, a request for the information during the boot process of the workstation from the workstation;
   (f) sending, from the interface processor, the request for the information to the responsive computer system;
   (g) receiving, at the interface processor, a second response from the responsive computer system answering the request for information; and
   (h) transmitting, from the interface processor, the received second response to the workstation.

7. The method in claim 6 wherein in step (c) the response is the first response received from a computer system.

8. In a network having a workstation with boot processes, a plurality of computer systems capable of performing the functions of a file server for the workstation, and an interface processor for communicating with the workstation and the computer systems, the workstation, the computer systems, and the interface processor coupled to the network, a method of retrieving information from a disk storage on one of the plurality of computer systems during the boot process of the workstation on the network, wherein during the boot process some ones or all Of the computer systems can provide boot services, said method comprising the steps of:

(a) intercepting, at the interface processor, a request for information from a disk during the boot process of the workstation;

(b) selecting, at the interface processor, which ones of the plurality of computer systems can provide boot services, (c) in response to the intercepted request, sending, from the interface processor, a request to open a path through the network for retrieval of the information, said request to be received by the selected ones of the plurality of computer systems which are coupled to the network;

(d) receiving, at the interface processor, a response from a responsive one of the selected computer systems;

(e) sending, from the interface processor, a confirmation to the responsive computer system on the network;

(f) sending, from the interface processor, the request for the information to the responsive computer system;

(g) receiving, at the interface processor, a response to the request for the information from the responsive computer system;

(h) extracting, from the interface processor, the information from the received response; and (i) transmitting, from the interface processor, the received response to the workstation.

9. In a network having workstations with boot processes, a plurality of computer systems capable of providing the functions of a file server, and an interface processor for communicating with the workstation and the computer systems, the workstation, the computer systems, and the interface processor coupled to the network, a method of retrieving data from disk storage on one of the plurality of computer systems during the boot process of a workstation on the network, wherein during the boot process some ones or all of the computer systems can provide boot services, said method comprising the steps of:

(a) intercepting, at the interface processor, a request for program code during the boot process of the workstation;

(b) selecting, at the interface processor, which ones of the plurality of computer systems can provide boot services, (c) sending, from the interface processor, a request for retrieval of data during the boot process of workstation on the network, said request to be received by the selected ones of the plurality of computer systems which are coupled on the network;

(d) receiving, at the interface processor, a response from a responsive one of the selected plurality of computer systems;

(e) responsive to the received first response, sending, from the interface processor, a confirmation to the responsive computer system on the network;

(f) sending, from the interface processor, the request for the program code to the responsive computer system on the network;

(g) receiving, at the interface processor, a second response from the responsive computer system through the network, the second response containing the requested computer code;

(h) retrieving, at the interface processor, the program code from the second response; and (i) transmitting, from the interface processor, the retrieved program code to the workstation.

10. The method in claim 9 wherein in step (d) the response is the first response received from any of the selected one of the computer systems.

11. In a network having workstations with boot processes, a plurality of computer systems each including a disk storage, and an interface processor for communicating with the workstation and the computer systems, the workstation, the computer systems, and the interface processor coupled to the network, a method of satisfying BIOS requests generated in a workstation with data in one of the disk storage of the plurality of computer systems, wherein during the boot process some ones or all of the computer systems can provide boot services, said method comprising the steps of:

(a) intercepting, at the interface processor, a BIOS request during the boot process of the workstation;

(b) identifying, at the interface processor, selected ones of the plurality of computer systems on the network for providing boot services to the workstation;

(c) opening, from the interface processor, a path on the network between the workstation and one of the selected ones of the plurality of computer systems;

(d) sending, from the interface processor, the BIOS request to the one of the selected ones of the plurality of computer systems on the network;

(e) receiving, at the interface processor, a response to the BIOS request from the one of the selected ones of the plurality of computer systems on the network; and (f) transmitting, from the interface processor, the received response to the workstation.

12. In a network having workstations with boot processes, a plurality of computer systems each having disk storage, and an interface processor for communicating with the workstation and the computer systems, the workstation, the computer systems, and the interface processor coupled to the network, a method of retrieving BIOS requests from the disk storage of one of the plurality of computer system during the boot process of a workstation on the network, wherein during the boot process some ones or all of the computer systems can provide boot services, said method comprising the steps of:

(a) sending, from the interface processor, a boot service request on the network, said request to be received by selected ones of the plurality of computer systems on the network;

(b) receiving, at the interface processor, a first response from a responsive one of the selected computer systems;

(c) sending, from the interface processor, an open boot path request through the network to the responsive computer system;

(d) intercepting, at the interface processor, a BIOS request during the boot process of the workstation;

(e) sending, from the interface processor, the BIOS request to the responsive computer system on the network after step (c) has been completed;

(f) receiving, at the interface processor, a second response to the BIOS request from the responsive computer system on the network; and (g) transmitting, from the interface processor, the second response to the BIOS request to the workstation.

13. The method in claim 12 wherein in step (b) the response is the first response received from the selected computer systems.

14. In a network having a workstation with boot processes, a plurality of computer systems capable of providing the functions of a file server for the workstation, and an interface processor for communicating with the workstation and the computer systems, the workstation, the computer systems, and the interface processor coupled to the network, a method of retrieving the Host Id and Socket ID during the boot process of the workstation on the network, wherein during the boot process some ones or all of the computer systems can provide boot services, said method comprising the steps of:

(a) sending, from the interface processor, a first data frame containing a boot service request on the network, said first data frame being coded to be received by selected ones of the plurality of computer systems which are coupled to the network;

(b) receiving, at the interface processor, a second data frame containing a response from a responsive one of said selected ones of the plurality of computer systems to the boot service request;

(c) sending, from the interface processor, a third data frame containing an open boot path request through the network, the third data frame being coded to be received by only the responsive computer system;

(d) receiving, at the interface processor, a fourth data frame containing a response to the open boot path request from the responsive computer system, the response including a Host Id and Socket ID which identify the one computer system on the network;

(e) using the Host Id in any requests sent to the responsive computer system from the workstation during the boot process; and (f) using the Socket ID for requests for data storage and retrieval from the responsive computer system from the workstation after the boot process is complete.

15. In a network having an interface processor, a workstation with a bootstrap loader with a boot process and one computer system which has disk storage, a method of pre-fetching DOS code from the disk storage of the one computer system in response to a request for a segment of DOS code generated by the bootstrap loader in the workstation during the boot process, said method comprising the steps of:

(a) sending, from the interface processor, a request or transfer of the segment of the DOS code through the network to the one computer system;

(b) receiving, at the interface processor, the requested segment and other segments of the DOS code from the one computer system;

(c) storing, at the interface processor, the received DOS code segments;

(d) transmitting, from the interface processor, the requested DOS code segment to the workstation; and (e) transmitting, from the interface processor, the other DOS code segments to the workstation as the other DOS code segments are requested.

16. The method in claim 15, wherein the network includes an interface processor having a memory area in which the pre-fetched DOS code is stored, where:

step (b) includes the step of receiving the requested segment and other segments of the DOS code at the interface processor;

step (c) includes the step of storing the received DOS code segments in the memory area of the interface processor; and step (d) includes the step of transmitting DOS segments to the workstation from the memory area of the interface processor.

17. The method in claim 15, wherein step (d) includes transmitting the requested segment and a plurality of the other segments.

18. In a network having a workstation with a bootstrap loader with a boot process and one computer system which has disk storage, a method of pre-fetching DOS code from the disk storage after a request for the bootstrap loader is generated by the workstation during the boot process of the workstation, said method comprising the steps of:

(a) sending a request for transfer of the bootstrap loader from the workstation to the one computer system;

(b) transmitting, the bootstrap loader and all segments of the DOS code from the one computer system to the workstation;

(c) receiving, in the network, the bootstrap loader from the one computer system and transmitting the bootstrap loader to the workstation;

(d) receiving, in the network, all segments of the DOS code from the one computer system;

(e) storing the DOS code in a memory area in the network; and (f) transmitting, to the workstation from the network memory area, the DOS code in segments in response to requests for the segments received from the workstation.

* * * * *

UNITED STATES PATENT AND TRADEMARK OFFICE
CERTIFICATE OF CORRECTION

PATENT NO. : 5,404,527
DATED : April 4, 1995
INVENTOR(S) : James S. Irwin, et al It is certified that error appears in the above-indentified patent and that said Letters Patent is hereby corrected as shown below:

Column 14, line 34: delete "networks" and insert --network,-- and delete "informations" and insert --information,--.

On cover page, under References Cited, OTHER PUBLICATIONS, please insert --Advance Netware V2.1 Sequenced Packet Exchange Protocol (SPX), Revision 2.0, Novell Inc., June 1987--.

Signed and Sealed this

Twenty-seventh Day of February, 1996

Attest:

BRUCE LEHMAN

*Attesting Officer*     *Commissioner of Patents and Trademarks*